US011692504B2

(12) United States Patent
Berkemeier et al.

(10) Patent No.: US 11,692,504 B2
(45) Date of Patent: Jul. 4, 2023

(54) METHODS AND SYSTEMS FOR A PRECHAMBER

(71) Applicant: Ford Global Technologies, LLC, Dearborn, MI (US)

(72) Inventors: Oliver Berkemeier, Bergisch Gladbach (DE); Maziar Khosravi, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/105,335

(22) Filed: Nov. 25, 2020

(65) Prior Publication Data

US 2021/0156334 A1 May 27, 2021

(30) Foreign Application Priority Data

Nov. 25, 2019 (DE) .......................... 102019131723.1

(51) Int. Cl.
*F02F 1/24* (2006.01)
*F02B 19/12* (2006.01)
*F02B 23/10* (2006.01)

(52) U.S. Cl.
CPC .............. *F02F 1/242* (2013.01); *F02B 19/12* (2013.01); *F02B 23/101* (2013.01)

(58) Field of Classification Search
CPC .......... F02F 1/242; F02B 23/101; F02B 19/12
See application file for complete search history.

(56) References Cited

U.S. PATENT DOCUMENTS

| 2,106,449 | A | * | 1/1938 | Boyd | H01T 13/14 |
| | | | | | 313/142 |
| 4,098,232 | A | | 7/1978 | Gleiter | |
| 7,438,043 | B2 | * | 10/2008 | Shiraishi | F02B 19/16 |
| | | | | | 123/266 |
| 9,397,482 | B2 | * | 7/2016 | Yamanaka | H01T 13/32 |
| 2006/0096571 | A1 | * | 5/2006 | Tourteaux | F02B 19/12 |
| | | | | | 123/266 |
| 2012/0025689 | A1 | * | 2/2012 | Kuhnert | H01T 13/39 |
| | | | | | 313/140 |
| 2012/0299459 | A1 | * | 11/2012 | Sakakura | H01T 13/54 |
| | | | | | 445/3 |
| 2013/0263813 | A1 | | 10/2013 | Fouquet | |
| 2014/0261298 | A1 | * | 9/2014 | Sasidharan | F02B 19/12 |
| | | | | | 123/286 |
| 2016/0230645 | A1 | * | 8/2016 | Schock | F02B 19/1052 |
| 2016/0252045 | A1 | | 9/2016 | Jacob | |
| 2019/0203636 | A1 | * | 7/2019 | Endo | F02M 35/10216 |
| 2020/0123963 | A1 | * | 4/2020 | Anderson | F02B 23/08 |

FOREIGN PATENT DOCUMENTS

DE 102018221917 A1 * 6/2020 ............. H01T 13/54

* cited by examiner

*Primary Examiner* — Kurt Philip Liethen
(74) *Attorney, Agent, or Firm* — Vincent Mastrogiacomo; McCoy Russell LLP

(57) ABSTRACT

Methods and systems are provided for a cylinder head. In one example, a system comprises cylinder head having a bore arranged therein. The bore comprises a coupling element therein configured to selectively receive an ignition plug.

18 Claims, 2 Drawing Sheets

METHODS AND SYSTEMS FOR A PRECHAMBER

FIELD

The present description relates generally to a prechamber of an engine.

BACKGROUND/SUMMARY

An applied-ignition reciprocating-piston internal combustion engine for a motor vehicle has a cylinder block, which may include at least two cylinders with pistons mounted displaceably therein, and a cylinder head which may be fastened to the cylinder block and on which inlet valves, outlet valves and ignition plugs are arranged. The ignition plugs may be serviceable components, although not all parts of an ignition plug actually wear over the service life. Single-cylinder engines are self-evidently also known.

U.S. 2013/0263813 A1 discloses a cylinder head for an internal combustion engine, having at least one main combustion chamber, which is provided in the cylinder head and which extends to a combustion chamber opening in a cylinder head base of the cylinder head. A prechamber is arranged in the cylinder head, wherein the main combustion chamber is connected to the prechamber via at least one flow transfer channel.

U.S. Pat. No. 4,098,232 A discloses a prechamber in the cylinder head of an applied-ignition internal combustion engine, wherein the prechamber, which has an opening for the ignition plug and at least one opening to the main combustion chamber, in the cylinder head is formed as a separate component, and a fuel-air mixture is fed through an injection nozzle to the prechamber.

The prechamber is arranged in an opening, which widens at least in certain portions toward the main combustion chamber, of the cylinder head and is fixed in the opening by fastening means which are arranged axially with respect to the injection nozzle central plane.

U.S. 2016/0252045 A1 discloses a cylinder head having at least one prechamber, having at least one ignition plug which projects into the prechamber, having at least one prechamber gas valve which opens into the prechamber, wherein the ignition plug and the prechamber gas valve are arranged in a common cavity of the cylinder head. The ignition plug and the prechamber gas valve are arranged in bores which intersect one another.

However, the inventors have found some issues with the prechambers described above. Mainly, spark plugs may degrade after a threshold amount of time. However, at the threshold amount of time, a prechamber and other components of the spark plug may not be degraded. Thus, replacing the spark plug along with the prechamber during a servicing may be expensive and inefficient. In other examples, the prechamber is removed with the spark plug during servicing of the spark plug. This may result in excess repair times and increased repair costs to the customer.

In one example, the issues described above may be addressed by a system comprises a cylinder head comprising a bore, wherein the bore comprises an upper portion configured to selectively receive an ignition plug, further comprising a lower portion of the bore into which an electrode of the ignition plug extends. In this way, the ignition plug may be serviced more efficiently, thereby reducing waste and a cost to the customer.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
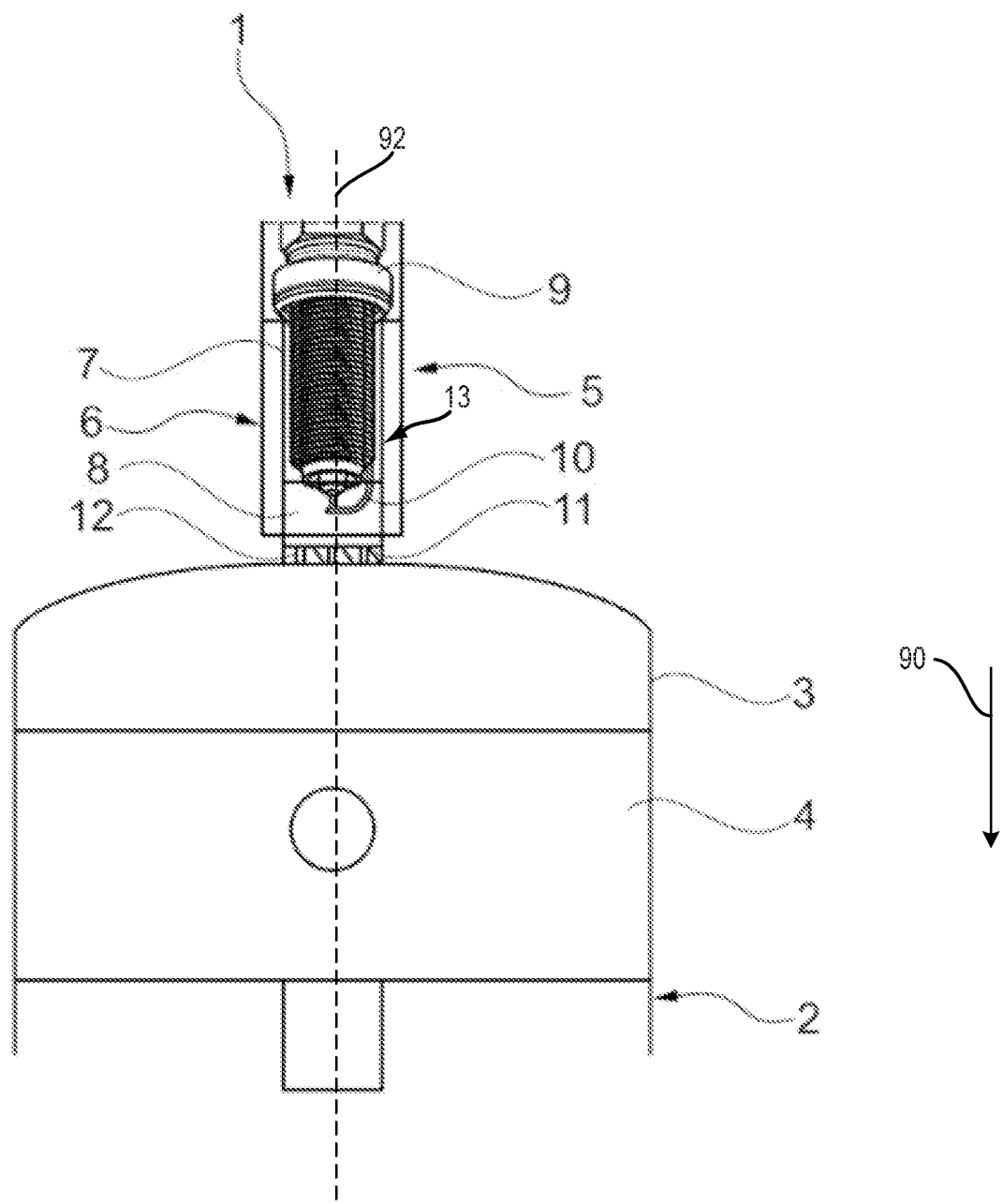
FIG. 1 shows a schematic illustration of an exemplary embodiment of a reciprocating-piston internal combustion engine according to the disclosure
Figure 2:
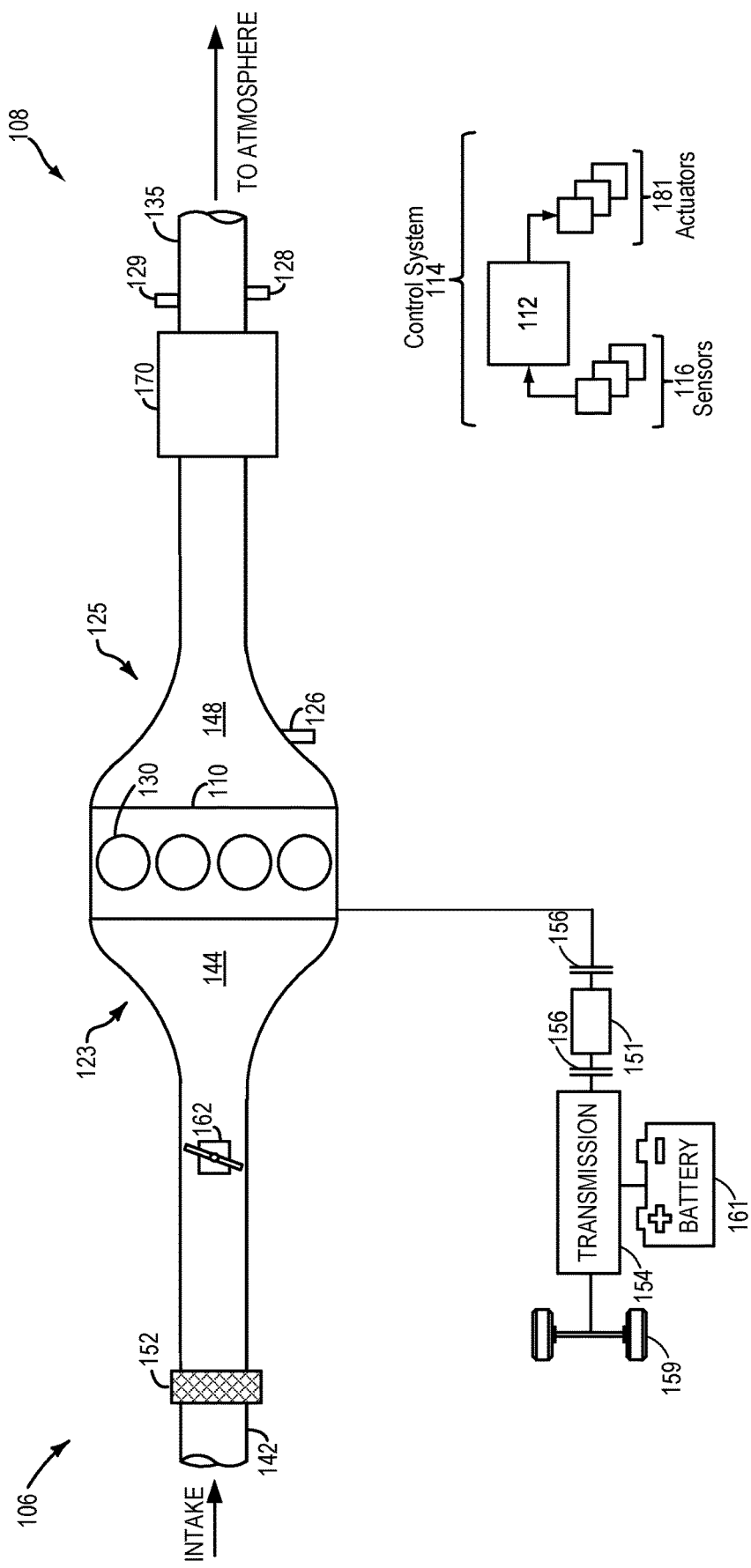
FIG. 2 illustrates a schematic of an engine included in a hybrid vehicle.

The following description relates to systems and methods for a cylinder head arrangement for a reciprocating-piston internal combustion engine, having a cylinder head which has at least one ignition plug threaded bore and at least one chamber which directly adjoins the ignition plug threaded bore at a combustion chamber side. An example of which is illustrated in FIG. 1. At least one ignition plug may be inserted into the ignition plug threaded bore such that a ground electrode of the ignition plug is arranged at least partially within the chamber. The disclosure furthermore relates to a method for producing a cylinder head for a reciprocating-piston internal combustion engine of a motor vehicle, as shown in FIG. 2, wherein, on the cylinder head, there is formed at least one ignition plug threaded bore and at least one chamber which directly adjoins the ignition plug threaded bore at a combustion chamber side and which serves for at least partially accommodating a ground electrode of an ignition plug that has been screwed into the ignition plug threaded bore.

In one example, the chamber is delimited at the combustion chamber side by a base on which at least one aperture is formed and which is an integral section of the cylinder head.

It is pointed out that the features and measures that are specified individually in the following description may be combined with one another in any technically expedient manner and highlight further embodiments of the disclosure. The description additionally characterizes and specifies the disclosure in particular in conjunction with the figure.

According to the disclosure, the chamber is formed without the use of additional components and the assembly thereof on the cylinder head, which reduces production and assembly costs and enhances the cylinder head arrangement according to the disclosure to be more robust. Instead, the chamber of the cylinder head arrangement according to the disclosure is formed between the ignition plug threaded bore and the base which delimits the chamber at the combustion chamber side, and said chamber is thus, other than at the side facing towards the ignition plug threaded bore, delimited by sections of the cylinder head itself, not by components which have been produced separately from the cylinder head and which have been additionally arranged thereon. The fact that the base is an integral section of the cylinder head means here that the base is produced monolithically or as a single piece with the rest of the cylinder head, that is to say is not a component produced separately from the cylinder head and connected to the cylinder head. Thus, in the event of servicing of a correspondingly equipped reciprocating-piston internal combustion engine, only the ignition plugs are unscrewed and removed from the cylinder head.

There is no demand to remove from the cylinder head any components which form the chamber because, according to the disclosure, no such components are provided.

On the base, there is formed one aperture or there are formed two or more apertures, which may each for example be in the form of a bore or which may have a cross-sectional area which deviates from a circular cross-sectional area, for example an elliptical, an oval, or a polygonal cross-sectional area. The respective aperture may also narrow or widen in the direction of the chamber in order to realize a nozzle function. In one example, as viewed from a combustion chamber in the direction of the cylinder head, the bore may not resemble a M12 or M14 bore seen in previous example for the ignition plug, but rather only the at least one aperture, which is smaller than the M12 or M14 bore previously used to house the ignition plug. The arrangement of the ignition plug or the electrodes of the ignition plug in a concealed or shielded manner in the chamber behind the base has the effect of mitigating the ignition plug serving as a heat source for possible premature ignitions. In this way, the operation of a correspondingly equipped reciprocating-piston internal combustion engine is improved. The ignition plug is relocated into a higher region outside of the combustion chamber.

The cylinder head may be a cast component, wherein the base of the chamber may be formed during the casting of the cylinder head. Alternatively, the chamber may be formed retroactively on the cylinder head, in particular by cutting machining of the cylinder head. The same applies to the ignition plug threaded bore. The ignition plug threaded bore transitions at the combustion chamber side directly into the chamber. In the case of cutting machining of the cylinder head, the ignition plug threaded bore and the chamber may be formed in succession using a single machining step, for example via one drilling process. The ignition plug can be screwed into the ignition plug threaded bore only as far as a stop or as far as a predefined depth, specifically only to such an extent that, in particular, the ground electrode of the ignition plug is arranged partially or entirely within the chamber.

In one embodiment, the chamber and the ignition plug threaded bore are sections of a common bore which are aligned with one another. In this way, the complexity for the production of the cylinder head is further simplified. It is for example possible here for the common bore to firstly be formed via a casting process or by cutting machining on the cylinder head, following which that section of the bore which is provided for the ignition plug threaded bore may be equipped with an internal thread. The chamber and the ignition plug threaded bore may in this case have the same internal diameter.

A further embodiment provides that a thickness of the base amounts to at most 5 mm. This allows a gas mixture which is present in a combustion chamber to quickly pass the base and arrive in the chamber in order to be able to be ignited there. At the same time, this ignition, or the ignition energy thereof, can propagate quickly through the base into the combustion chamber in order to be able to ensure optimum operation of a correspondingly equipped reciprocating-piston internal combustion engine. The thickness of the base may for example amount to at most 4 mm, in particular at most 3 mm.

According to a further embodiment, a diameter of the aperture amounts to at most 2 mm. In this way, the ignition plug is adequately shielded via the base in order to be able to reliably mitigate the occurrence of premature ignition owing to a hot ignition plug. The diameter of the aperture may for example lies in a range from 1 mm to 2 mm.

According to a further embodiment, at least two apertures are formed, spaced apart from one another, on the base. For example, four apertures are formed on the base. In interaction with the respective diameters of the apertures, the flow resistance of the base can be set via the number of apertures on the base. Additionally or alternatively, the flow resistance may be set based on a cross-sectional flow through area of the apertures on the base.

The above object is furthermore achieved via a reciprocating-piston internal combustion engine which has at least one cylinder head arrangement according to any of the abovementioned embodiments or according to a combination of at least two of these embodiments with one another, the cylinder head of which arrangement is fastenable to the cylinder block.

The solutions mentioned above with regard to the cylinder arrangement are correspondingly associated with the reciprocating-piston internal combustion engine. The reciprocating-piston internal combustion engine is in the form of an Otto-cycle engine. The motor vehicle may for example be a passenger motor vehicle or a utility vehicle.

A method of producing the chamber may include where the chamber is produced via a casting process or via a cutting machining process on the cylinder head such that the chamber is delimited at the combustion chamber side by a base on which at least one aperture is formed and which is an integral section of the cylinder head.

The benefits mentioned above with regard to the cylinder arrangement are correspondingly associated with the method. In particular, the cylinder head according to any of the abovementioned embodiments or according to a combination of at least two of these embodiments with one another can be produced using the method.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a schematic illustration of an exemplary embodiment of an applied-ignition reciprocating-piston internal combustion engine 1 according to the disclosure for a motor vehicle.

The reciprocating-piston internal combustion engine 1 has a cylinder block 2, of which only one cylinder 3 is shown, in which a working piston 4 is guided in displaceable fashion.

The reciprocating-piston internal combustion engine 1 furthermore has a cylinder head arrangement 5. The cylinder head arrangement 5 has a cylinder head 6 which may include an ignition plug threaded bore 7 and a chamber 8 which directly adjoins the ignition plug threaded bore 7 at a combustion chamber side. The chamber 8 and the ignition plug threaded bore 7 may be sections of a common bore which are aligned with one another.

Furthermore, the cylinder head arrangement 5 may include an ignition plug 9. The ignition plug 9 may be configured to thread and/or screw into the ignition plug threaded bore 7 such that a ground electrode 10 of the ignition plug 9 is arranged partially within the chamber 8.

The chamber 8 may be delimited at the combustion chamber side by a base 11 on which there may be two or more apertures 12 which are arranged so as to be spaced apart from one another, which base is an integral section of the cylinder head 6. A thickness of the base 11 may be less than a threshold amount (e.g., 5 mm). A diameter of a respective aperture of the apertures 12 may be less than a lower threshold amount. In one example, the base 11 comprises a thickness of 5 mm and the diameter of the apertures is 2 mm. It will be appreciated that the dimensions of the base 11 and the apertures 12 may be adjusted without departing from the scope of the present disclosure.

Thus, FIG. 1 illustrates the example combustion engine 1 including the cylinder head arrangement 5 and the cylinder block 2. The combustion chamber 3 may be arranged in the cylinder block 2 with the piston 4 configured to oscillate therein. The piston 4 may oscillate through a range including a bottom-dead-center (BDC) position and a top-dead-center (TDC). BDC may correspond to a position of the piston 4 furthest away from the base 11 and TDC may correspond to a position of the piston 4 nearest the base 11. As such, the combustion chamber 3 may be defined by the cylinder block 2 and the base 11.

The cylinder head 6 may be positioned above the base 11, relative to a direction of gravity 90. In one example, the cylinder head 6 and the base 11 may be manufactured as a single piece. The cylinder head 6 may include a bore 13 arranged therein. In one example, an axis 92, about which the piston 4 oscillates, may pass through a geometric center of the bore 13.

The bore 13 may include two portions, including the ignition plug threaded bore 7 (e.g., an upper portion) and the chamber 8 (e.g., a lower portion). The chamber 8 may be positioned closer to the base 11 than the ignition plug threaded bore 7. In the example of FIG. 1, a diameter of the chamber 8 and the ignition plug threaded bore 7 are substantially identical. In one example, threads of the ignition plug threaded bore 7 may differentiate the two diameters.

The ignition plug 9 may be configured to be selectively arranged in the ignition plug threaded bore 7. Threads of the ignition plug threaded bore 7 may be limit an amount in which the ignition plug 9 may extend through the bore 13. In one example, the threads allow the ignition plug 9 to extend to an extent such that the ground electrode 10 thereof is at least partially inserted into the chamber 8. In one example, the ground electrode 10 is completely arranged in the chamber 8 while being spaced away from the base 11.

In one example, the chamber 8 may be fluidly coupled to the combustion chamber 3 via the plurality of apertures 12. As such, mediums such as combustion chamber gases, fuel injections, and the like may flow from the combustion chamber 3, through the plurality of apertures 12, into the chamber 8, and vice-versa. In one example, combustion chamber gases along with a portion of a fuel injection are directed to the chamber 8 via the plurality of apertures 12, wherein the ignition plug 9 ignites the mixture via the ground electrode 10. In one example, the ignition plug threaded bore 7 portion of the bore 13 is hermetically sealed from the chamber 8 such that gases in the chamber 8 are blocked from entering the ignition plug threaded bore 7. In this way, the chamber 8 may function as a prechamber arranged outside of and spaced away from the combustion chamber 3. The chamber 8 and the ignition plug threaded bore 7 are arranged with a common bore 13, wherein the axis 92 passes through geometric centers of each of the chamber 8 and the ignition plug threaded bore 7.

FIG. 2 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 may be used similarly to engine 1 of FIG. 1. As such, the cylinder 3 may be one cylinder of the plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152.

Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

In this way, a prechamber and an ignition plug may be more easily arranged into an engine of a vehicle. A common bore may comprise features to shape the prechamber while selectively receiving the ignition plug. The technical effect of selectively coupling or decoupling the ignition plug to the common bore without removing the prechamber is to enhance maintenance thereof while also decreasing waste. By doing this, manufacture of the cylinder head may be simplified along with maintenance thereof.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cylinder head coupled to a combustion chamber, the cylinder head comprising a bore, wherein the bore comprises an upper portion configured to selectively receive an ignition plug and a lower portion into which an electrode of the ignition plug extends, and the system being an engine system,
wherein the lower portion of the bore is a prechamber of the cylinder head that is outside of the combustion chamber and separated from the combustion chamber via a base, wherein the base is positioned completely above the combustion chamber,
wherein the base is positioned between the cylinder head and the combustion chamber, wherein the upper portion and the lower portion are completely external to a top wall of the combustion chamber,
wherein a piston is positioned within the combustion chamber,
wherein the base is above the combustion chamber and directly on top of the combustion chamber,
wherein the base comprises a plurality of apertures configured to fluidly couple the lower portion of the bore to the combustion chamber, and
wherein the base is externally accessible and forms part of an external surface of the engine system.

2. The system of claim 1, wherein the bore comprises a uniform diameter for the upper portion and the lower portion, and wherein a diameter of the ignition plug varies.

3. The system of claim 1, wherein a central axis that extends through a geometric center of the bore is also an axis along which the piston oscillates within the combustion chamber.

4. The system of claim 1, wherein the lower portion is spaced away from the combustion chamber via the base, and wherein the upper portion and the lower portion are further completely above the top wall of the combustion chamber.

5. The system of claim 1, wherein apertures of the plurality of apertures are spaced apart from one another and are parallel to a central axis that extends through a geometric center of the bore.

6. The system of claim 1, wherein the upper portion is threaded and wherein the lower portion is smooth.

7. The system of claim 6, wherein the ignition plug is threaded into the upper portion, wherein a portion of the ignition plug extends into the lower portion that is smooth.

8. The system of claim 1, wherein the upper portion is sealed from the lower portion.

9. An engine system, comprising:
a combustion chamber shaped via a cylinder block and a cylinder head, wherein a piston is configured to oscillate within the combustion chamber along an axis; and
a bore arranged in the cylinder head fluidly coupled to the combustion chamber via a plurality of apertures arranged in a base of the cylinder head,
wherein the base spatially separates a prechamber that is in a lower portion of the bore from the combustion chamber,
wherein the bore further comprises a threaded portion that is in an upper portion of the bore and configured to receive an ignition plug,
wherein an electrode of the ignition plug is positioned within the prechamber,
wherein the prechamber and the electrode of the ignition plug are positioned outside of the combustion chamber,
wherein the base is outside of the combustion chamber, the base positioned between the cylinder head and the combustion chamber,
wherein the base is above the combustion chamber and directly on top of a top wall of the combustion chamber, and
wherein the upper portion and the lower portion are completely external to a top wall of the combustion chamber, and
wherein the base is externally accessible and forms part of an external surface of the engine system.

10. The engine system of claim 9, wherein the ignition plug is configured such that when the ignition plug is threaded into the threaded portion, a first portion of the ignition plug that is in the upper portion has a first diameter, the first diameter being greater than a second diameter of a second portion of the ignition plug that is in the lower portion, and wherein the bore, including the upper portion and the lower portion, has a substantially uniform diameter.

11. The engine system of claim 10, wherein the ignition plug is threaded into the threaded portion, wherein the ignition plug is selectively removable from the bore without removing the prechamber, and wherein the upper portion is sealed from the lower portion.

12. The engine system of claim 9, wherein the base comprises a thickness less than or equal to a threshold amount, wherein the threshold amount is 5 mm.

13. The engine system of claim 9, wherein apertures of the plurality of apertures are identically sized and shaped.

14. The engine system of claim 9, wherein apertures of the plurality of apertures vary in one or more of size, shape, and orientation.

15. The engine system of claim 9, wherein the cylinder head including the prechamber is a single piece.

16. An engine system, comprising:
a combustion chamber shaped via a cylinder block and a cylinder head, wherein a piston is configured to oscillate within the combustion chamber along an axis; and
a bore arranged in the cylinder head fluidly coupled to the combustion chamber via a plurality of apertures arranged in a base of the cylinder head,
wherein the base spatially separates a prechamber of the bore from the combustion chamber,
wherein the bore further comprises a threaded portion that is in an upper portion of the bore configured to receive an ignition plug,
wherein the threaded portion allows a negative electrode of the ignition plug to extend into the prechamber that is in a lower portion of the bore,
wherein the negative electrode of the ignition plug and the prechamber are positioned outside of the combustion chamber and separated from the combustion chamber, and
wherein the base is outside and completely above the combustion chamber, the base positioned between the cylinder head and the combustion chamber,
wherein the base is positioned above the combustion chamber and directly on top of the combustion chamber,
wherein the upper portion and the lower portion are completely external to a top wall of the combustion chamber, and
wherein the base is externally accessible and forms part of an external surface of the engine system.

17. The engine system of claim 16, wherein the threaded portion and the prechamber are aligned along the axis, and wherein the bore comprises a uniform diameter.

18. The engine system of claim 17, wherein there are no additional inlets or other outlets fluidly coupling the combustion chamber to the prechamber other than the plurality of apertures.

* * * * *